United States Patent [19]
Sugihara et al.

[11] Patent Number: 6,122,018
[45] Date of Patent: Sep. 19, 2000

[54] VIDEO DISPLAY APPARATUS AND METHOD FOR CONTROLLING THE SWITCHING OF EXTERNAL INPUT TERMINALS THEREOF

[75] Inventors: Masakazu Sugihara; Haruko Kono, both of Kanagawa, Japan

[73] Assignee: Sony Corporation, Tokyo, Japan

[21] Appl. No.: 09/007,577

[22] Filed: Jan. 15, 1998

[30] Foreign Application Priority Data

Jan. 17, 1997 [JP] Japan ................................. 9-019758

[51] Int. Cl.⁷ ............................ H04N 5/2686; H04N 5/46
[52] U.S. Cl. .................. 348/705; 348/706; 348/708; 348/584; 348/553; 348/659
[58] Field of Search ............................ 348/705, 706, 348/708, 555, 584, 659, 660, 734, 159, 485, 553; 345/1, 3, 327; 327/99, 407; H04N 5/46, 5/268

[56] References Cited

U.S. PATENT DOCUMENTS

| | | | |
|---|---|---|---|
| 4,218,709 | 8/1980 | Baxter et al. | 348/705 |
| 4,764,812 | 8/1988 | Hamley | 348/705 |
| 4,814,883 | 3/1989 | Perine et al. | 348/705 |
| 4,858,011 | 8/1989 | Jackson et al. | 348/705 |
| 5,162,903 | 11/1992 | Ogino et al. | 348/705 |
| 5,243,425 | 9/1993 | Thompson | 348/705 |
| 5,264,929 | 11/1993 | Yamaguchi | 348/705 |
| 5,305,105 | 4/1994 | Heo | 348/485 |
| 5,594,509 | 1/1997 | Florin et al. | 348/731 |
| 5,754,255 | 5/1998 | Takamori | 348/705 |
| 5,781,250 | 7/1998 | Jun | 348/706 |
| 5,838,393 | 11/1998 | Simpson et al. | 348/705 |
| 5,872,562 | 2/1999 | McConnell et al. | 348/734 |
| 5,886,545 | 3/1999 | Sakuda et al. | 348/705 |
| 5,898,463 | 4/1999 | Nishiyama | 348/705 |
| 5,917,557 | 6/1999 | Toyoda | 348/705 |
| 5,953,144 | 9/1999 | Darbee et al. | 348/734 |
| 5,969,774 | 10/1999 | Wininger | 348/734 |
| 5,990,803 | 11/1999 | Park | 348/734 |

*Primary Examiner*—John K. Peng
*Assistant Examiner*—Jean W. Désir
*Attorney, Agent, or Firm*—Frommer Lawrence & Haug, LLP.; William S. Frommer

[57] ABSTRACT

A video display apparatus includes: storage means for holding connection information on connections between a external input terminals and external units corresponding thereto; and switching control means for performing control so that each terminal not connected to the corresponding external unit among the external input terminals is skipped based on the connection information stored in the storage means when the switching of the external input terminals is performed. The switching of the external input terminals is controlled by the steps of: previously storing the connection information on connections between the external input terminals and the external units corresponding thereto in a memory; referring to the stored connection information when the switching of the external input terminals is performed; and skipping each external input terminal not being connected to the corresponding external unit, based on the result of the referring.

8 Claims, 8 Drawing Sheets

VIDEO DISPLAY APPARATUS AND METHOD FOR CONTROLLING THE SWITCHING OF EXTERNAL INPUT TERMINALS THEREOF

BACKGROUND OF THE INVENTION

1. Field of the Invention

The present invention relates to video display apparatuses such as television receivers and video monitors, and in particular, to a video display apparatus in which, when a plurality of external input terminals are switched, a switching operation is simplified to enable rapid switching.

2. Description of the Related Art

A television receiver includes a plurality of external input terminals in order that various units, such as a video cassette recorder (VCR), a laser disc player (hereinafter referred to as an "LD"), and a satellite communications tuner (hereinafter referred to as a "BS tuner"), may be connected to the receiver.

As shown in FIG. 6, these external input terminals can be switched by pressing an input switching button 50 provided on a remote controller attached to the television receiver. Specifically, for example, as shown in FIG. 7, by repeatedly pressing the input switching button 50, a user can switch the present input to the desired input in sequential order of "TV", "VIDEO 1", "VIDEO 2", "VIDEO 3", "VIDEO 4", "VIDEO 5" and "TV", displayed on the screen of the television receiver.

This conventional input switching technique has the following problem: for example, in the case where only the external input terminal corresponding to "VIDEO 1" is connected to one external unit by the user, after the user has pressed the input switching button 50 so as to switch the present input to one external input, the user must see the screen on which indications ("VIDEO 2" through "VIDEO 5" in this case), corresponding to the other external input terminals without input signals, are displayed before an indication of "TV" is displayed. Also, if external inputs are separately provided such that a TV direct button 61, and the other direct buttons 62 to 66 are formed as shown in FIG. 8, pressing one direct button enables immediate switching to the desired external input. However, in order to use such a technique, additional buttons must be disadvantageously formed on a remote controller already having many buttons.

SUMMARY OF THE INVENTION

Accordingly, it is an object of the present invention to provide a video display apparatus provided with a plurality of external input terminals, in which the operation of switching the present input to the desired input is simplified to enable immediate switching.

To this end, according to an aspect of the present invention, the foregoing object has been achieved through provision of a video display apparatus provided with a plurality of external input terminals, including: storage means for holding connection information on connections between the plurality of external input terminals and external units corresponding thereto; and switching control means for performing control so that each terminal not connected to the corresponding external unit among the plurality of external input terminals is skipped based on the connection information stored in the storage means when the switching of the plurality of external input terminals is performed.

Preferably, the video display apparatus further includes a remote controller, which is used to store the connection information in the storage means.

The video display apparatus may further include display means for displaying the connection information on the screen of the video display apparatus, wherein the remote controller enables the setting of the connection information displayed on the screen of the video display apparatus, and the connection information set on the screen is stored in the storage means.

The connection information displayed on the screen may include information representing the types of the external units connected to the external input terminals, and the remote controller may be capable of selecting one item from the information representing the types of the external units, displayed for selection on the screen.

The information representing the types of the external units, displayed for selection on the screen, may include each item to be skipped representing no connection to each external unit.

According to another aspect of the present invention, the foregoing object has been achieved through provision of a switching control method for controlling the switching of a plurality of external input terminals in an external input terminal-included video display apparatus, the switching control method comprising the steps of: previously storing connection information on connections between the plurality of external input terminals and external units corresponding thereto, in a memory; referring to the stored connection information when the switching of the plurality of external input terminals is performed; and skipping each external input terminal not being connected to the corresponding external unit, based on the result of the referring.

The connection information may be stored in the memory by using a remote controller.

The connection information may be displayed on the screen of the video display apparatus, so that the remote controller can be used to perform the setting of the connection information displayed on the screen, and the connection information set on the screen can be stored in the memory.

The connection information displayed on the screen may include information representing the types of the external units connected to the plurality of external input terminals, and the remoter commander may be used to select one item from the information representing the types of the external units, displayed for selection on the screen.

The information representing the types of the external units, displayed for selection on the screen, may include each item to be skipped representing no connection to each external unit.

According to the present invention, in a video display apparatus provided with a plurality of external input terminals, the number of times for switching an input condition to the desired condition can be reduced to enable simplify an switching operation and rapid switching.

DESCRIPTION OF THE PREFERRED EMBODIMENT

The present invention will be described below with reference to the attached drawings.

Figure 1:
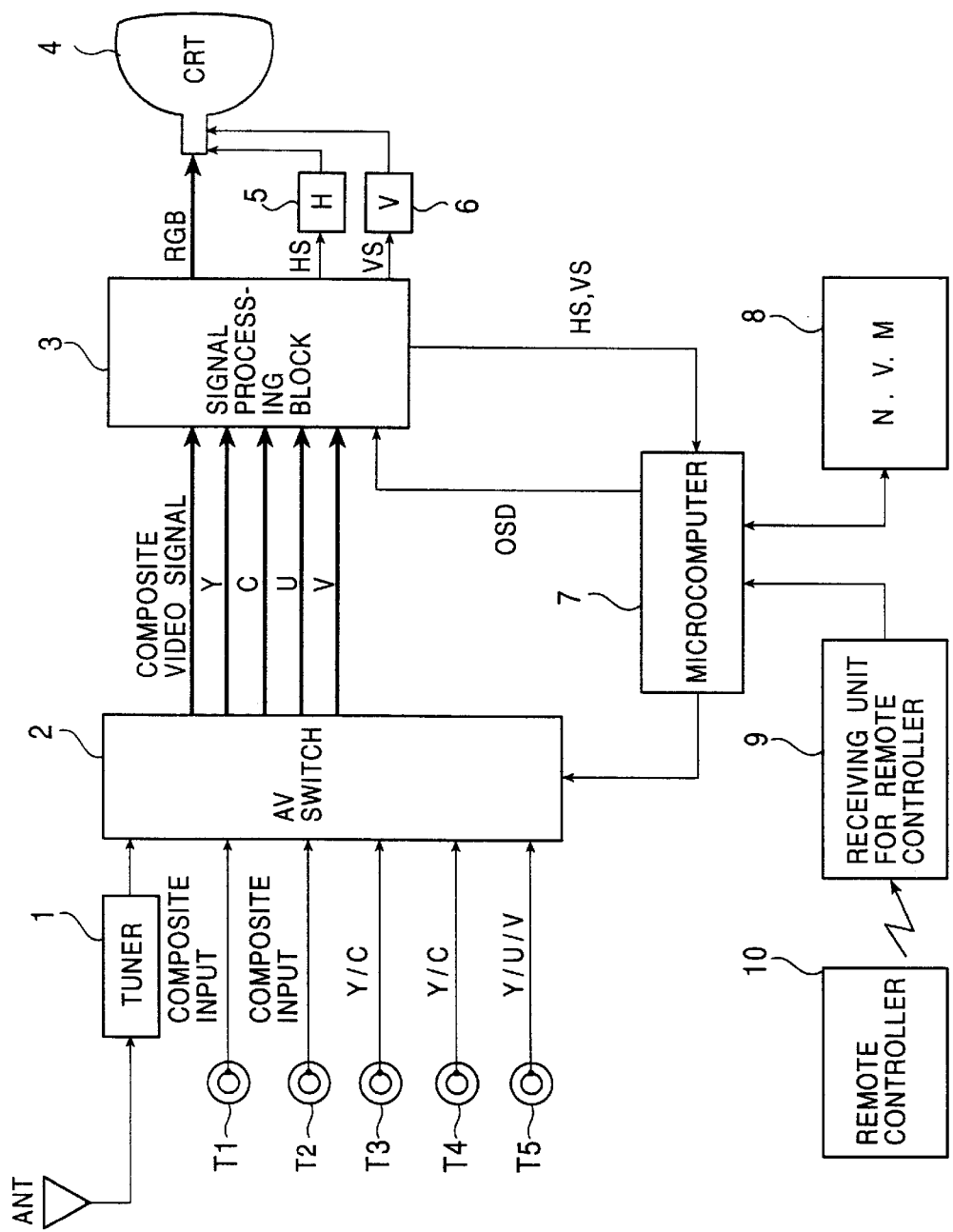
FIG. 1 is a block diagram showing a television receiver according to an embodiment of the present invention.

FIG. 1 shows a block diagram of a television receiver according to an embodiment of the present invention.

This television receiver includes a tuner 1 for selecting a program from broadcast television programs received by an antenna (ANT), and five external input terminals T1 to T5. The terminals T1 and T2 are composite input terminals. The terminals T3 and T4 are Y/C separation input terminals (S terminals). The terminal 5 is a Y/U/V input terminal.

The output of the tuner 1 and the outputs of the external input terminals T1 to T5 are input to an AV switch 2. Under control of a microcomputer 7, the AV switch 2 outputs composite video signals, Y/C separate signals or a Y/U/V signal to a signal processing block 3.

The signal processing block 3 generates red, green and blue (RGB) signals from the input video signals, and outputs the generated RGB signals to a cathode-ray tube (CRT) 4. The signal processing block 3 also performs separation to generate a horizontal synchronizing signal HS and a vertical synchronizing signal VS, and outputs the horizontal synchronizing signal HS to a horizontal deflection circuit 5, the vertical synchronizing signal VS to a vertical deflection circuit 6, and both signal HS and VS to the microcomputer 7.

The horizontal deflection circuit 5 generates a sawtooth horizontal deflection signal, based on the input horizontal synchronizing signal HS, and applies the generated signal to the CRT 4. The vertical deflection circuit 6 similarly applies a vertical deflection signal to the CRT 4.

The microcomputer 7 uses the input horizontal synchronizing signal HS and vertical synchronizing signal VS as timing signals. The microcomputer 7 also receives a command input with a remote controller 10 by a user via a receiving unit 9 for the remote controller 10, and performs control of the AV switch 2, the storing of various data to a non-volatile memory (shown as "N.V.M") 8, control of on-screen display (hereinafter referred to as an "OSD"), and so forth.

Figure 2:
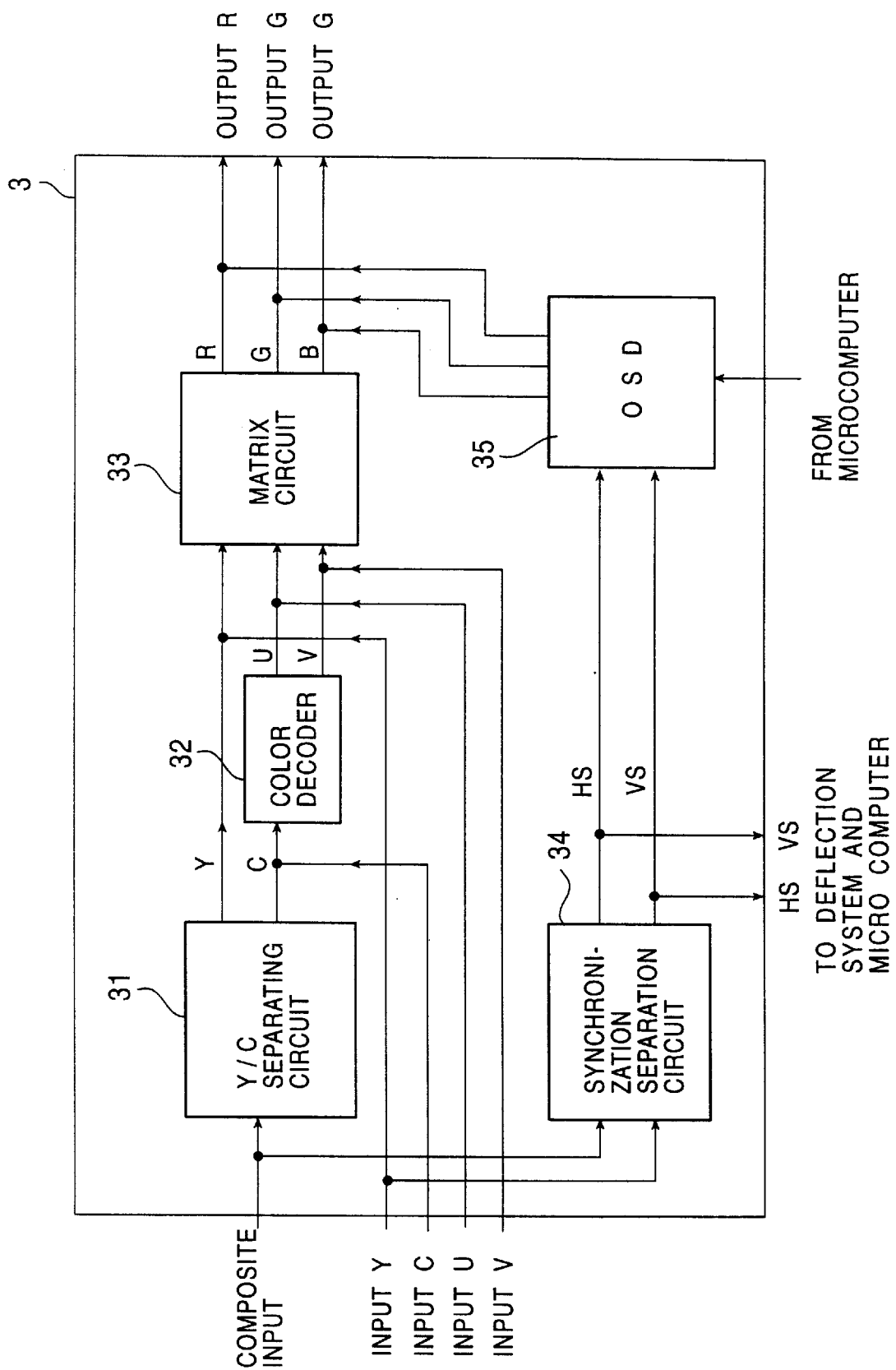
FIG. 2 is a block diagram showing the signal processing block of the television receiver shown in FIG. 1.

FIG. 2 shows the structure of the signal processing block 3. The signal processing block 3 includes a Y/C separation circuit 31 for separating a Y signal and a C signal from the input composite video signal, a color decoder 32 for decoding the C signal to generate a U signal and a V signal, and a matrix circuit 33 for generating RGB signals from the Y, U and V signals. The signal processing block 3 also includes a synchronization-separation circuit 34 for separating the horizontal synchronizing signal HS and the vertical synchronizing signal VS from the composite video signal or the Y signal, and an OSD circuit 35.

When the composite video signal is input to the signal processing block 3 shown in FIG. 2, the input composite video signal is sent to the Y/C separation circuit 31 and the synchronization-separation circuit 34. The Y/C separation circuit 31 separates the Y and C signals from the composite video signal, and sends the Y signal to the matrix circuit 33, and the C signal to the color decoder 32. The color decoder 32 decodes the sent signal to generate the U and V signals, and sends them to the matrix circuit 33. The matrix circuit 33 uses the Y signal sent from the Y/C separation circuit 31 and the U and V signals sent from the color decoder 32 to generate the RGB signals, and outputs them to the external CRT 4. The synchronization-separation circuit 34 separates the horizontal synchronizing signal HS and the vertical synchronizing signal VS from the composite video signal, and outputs both signals to the OSD circuit 35, the external deflection system and the microcomputer 7. The OSD circuit 35 generates OSD signals in accordance with a command sent from the microcomputer 7, using the horizontal synchronizing signal HS and the vertical synchronizing signal VS as timing signals, and outputs the generated OSD signals to the external CRT 4.

When Y/C separate signals are input to the signal processing block 3 shown in FIG. 2, the Y signal is directly input to the matrix circuit 33, and the Y signal is also input to the synchronization-separation circuit 34. In other points, the signal processing block 3 operates similarly when the composite video signal is input. When Y/U/V separate signals are input to the signal processing block 3, the Y, U and V signals are directly input to the matrix circuit 33. In other points, the signal processing block 3 operates similarly when the Y/C separate signals are input.

Next, an external-input switching operation performed by the television receiver shown in FIG. 1 will be described. Here, let only the external input terminal T1 be connected to an external unit. At first, the user operates the remote controller 10 so that a video-label rewriting mode can be set. A video label means the function of on-screen displaying the types of inputting units (e.g., beta, VHS, 8 mm and a game) when the user switches the type of an input video signal to the external terminals.

When the user operates the remote controller 10 to input a command for setting the video-label rewriting mode, this command is input to the microprocessor 7 via the receiving unit 9. On decoding this command, the microprocessor 7 instructs the OSD circuit 35 in the signal processing block 3 to generate a predetermined OSD signal.

Figure 3A:
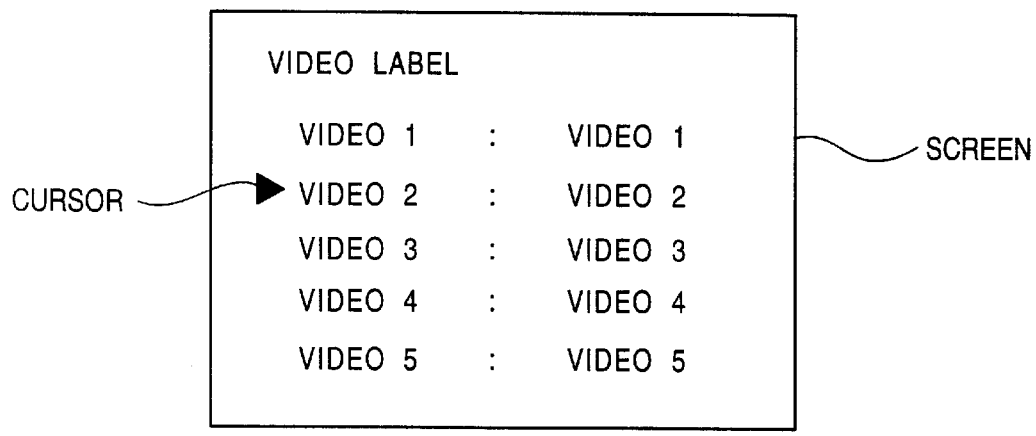
FIGS. 3A to 3C are charts showing on-screen displays projected when the setting of external input terminals not used so as to be skipped is performed.

The OSD circuit 35 generates the OSD signal and outputs it to the CRT 4, whose condition is shown in FIG. 3A.

As shown in FIG. 3A, the external input terminals T1 to T5 are set as to correspond to videos 1 to 5. With this setting being unchanged, when the selecting of the external input terminals T1 to T5 is performed with the AV switch 2, each of "VIDEO 1" to "VIDEO 5" is only displayed on an end portion (e.g., top right portion) of the screen of the CRT 4. In other words, the original function of the video label is not used.

Figure 3B:
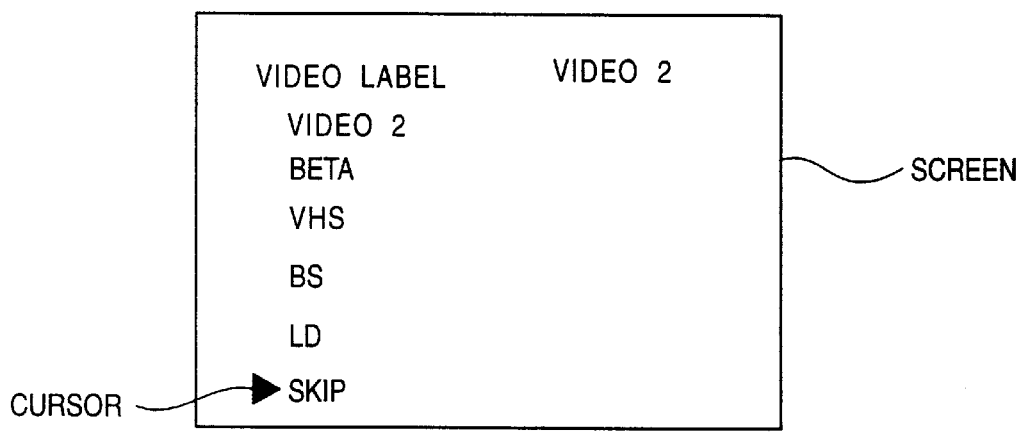

The user operates the remote controller 10 to rewrite the video label while watching the screen shown in FIG. 3A. Here, one external unit is connected to only the external input terminal T1. Accordingly, the user performs setting so as to unchange the external input terminal T1 corresponding to video 1 and so as to skip the external input terminals T2 to T5. Specifically, the user presses a cursor moving key to position the cursor so that it corresponds to the external input terminal T2, and presses a return key. As a result, on the screen is projected a display for rewriting the video label corresponding to the external input terminal T2, as shown in FIG. 3B. While watching the display, the user presses the cursor moving key of the remote controller 10 to position the cursor at an item to be skipped, and presses the return key.

Figure 3C:
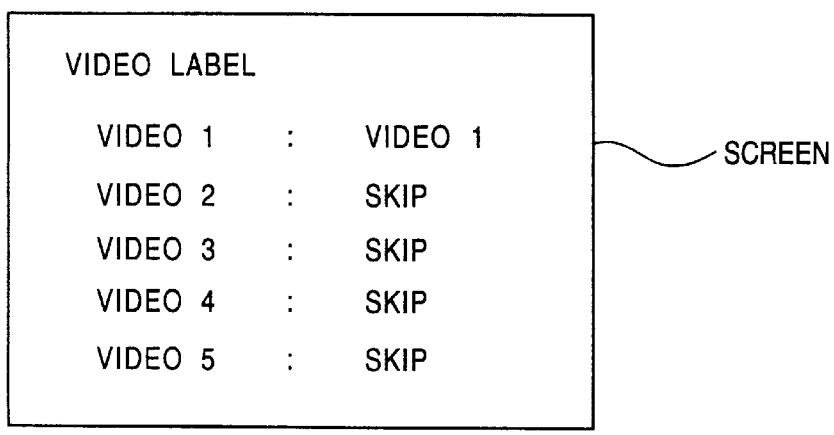

In the same manner, in connection with also the external input terminals T3, T4 and T5, the user positions the cursor at each item to be skipped and presses the return key. As a result, as shown in FIG. 3C, the external input terminal T1 is set to correspond to video 1, and the external terminals T2 to T5 are set so as to be skipped.

Information of such setting is stored in the non-volatile memory 8 connected to the microcomputer 7.

Figure 4:
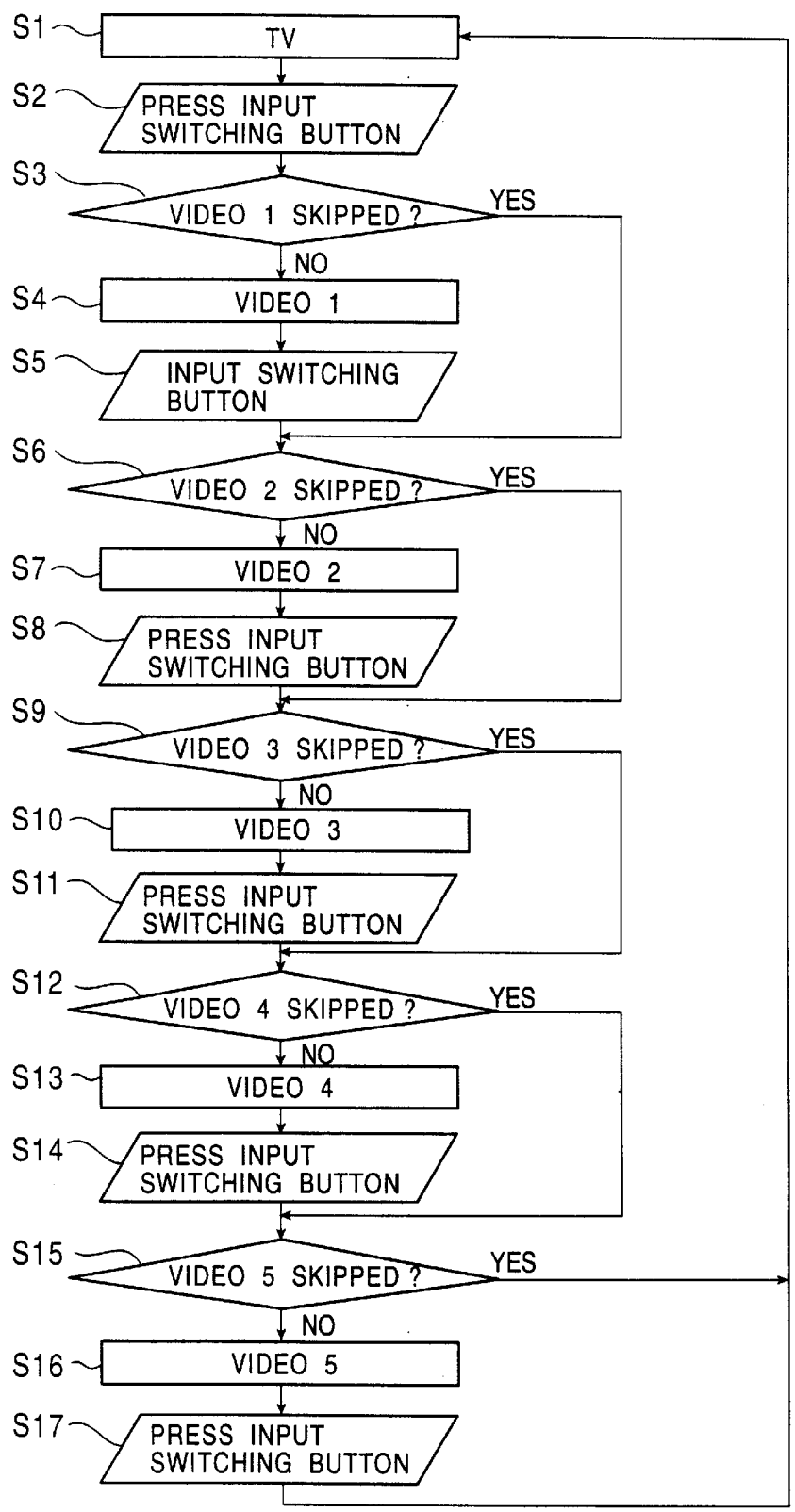
FIG. 4 is a flowchart showing an external-input switching operation performed in the television receiver shown in FIG. 1.
Figure 6:
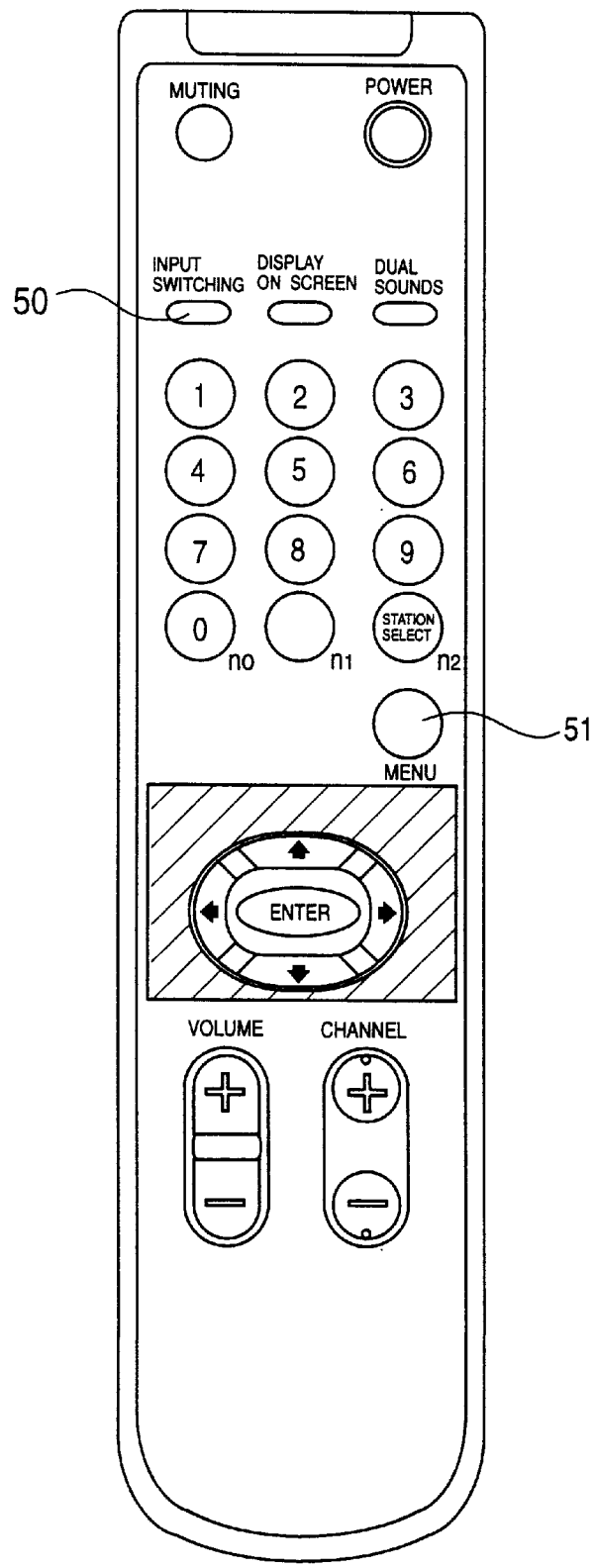
FIG. 6 is a plan view showing a remote controller for a conventional television receiver.
Figure 7:
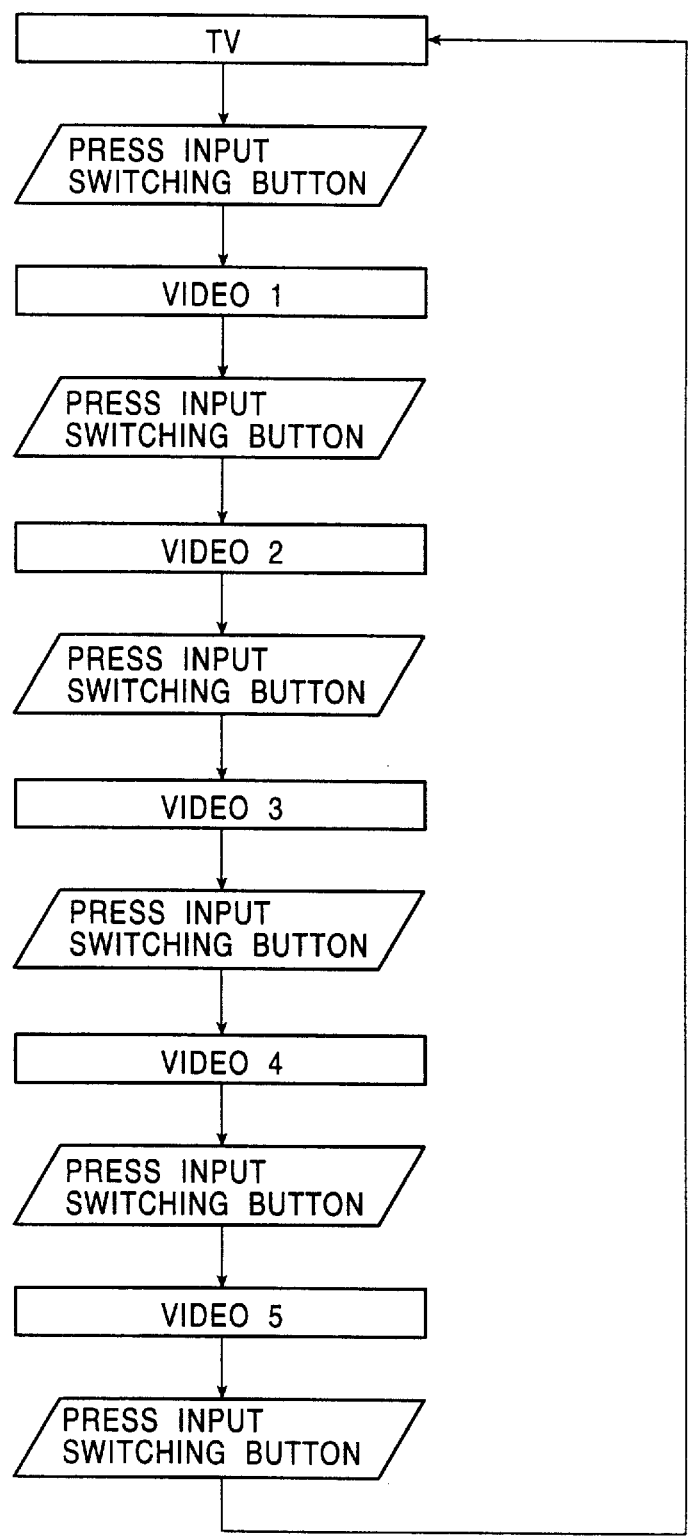
FIG. 7 is a flowchart showing an external-input switching operation performed in the conventional television receiver.

Next, an external-input switching operation performed by the television receiver shown in FIG. 1, after the video label setting is performed, will be described with reference to a flowchart shown in FIG. 4. Specifically, the external-input switching operation, in which a remote controller shown in FIG. 6 is used, will be described.

Initially, the input is set so as to correspond to "TV" representing a condition in which the output of the tuner 1 is input (step S1). In this condition, the input switching button of the remote controller is pressed (step S2), which determines whether or not the external input terminal T1 is set so as to be skipped (step S3).

If the external input terminal T1 is not set so as to be skipped, the input is switched to the external input terminal T1 (step S4). Since the external input terminal T1 is not set so as to be skipped in this embodiment, the input is switched to the external input terminal T1.

In this condition, the input switching button is pressed again (step S5), which determines whether or not the external input terminal T2 is set so as to be skipped (step S6). If the external input terminal T2 is not set so as to be skipped, the input is switched to the external input terminal T2 (step S7). If the external input terminal T2 is set so as to be skipped, determination of whether or not the external input terminal T3 is set so as to be skipped is performed (step S9).

Since the external input terminal T2 is set so as to be skipped in this embodiment, determination of whether or not the external input terminal T3 is set so as to be skipped is performed. In addition, the external input terminals T3, T4 and T5 are set so as to be skipped, which causes the operation process to step S1 to pass through the subsequent steps S12 and S15 before returning to step S1. In other words, when the input has been switched to the external input terminal T1, only once pressing the input switching button can return the operation process to the TV input condition.

According to this embodiment, whenever the input switching button is pressed, the external input terminals set so as to be skipped can be skipped when the external input is switched. Accordingly, when switching to the desired input condition is performed, the number of times for operating the remote controller can be reduced.

Figure 5:
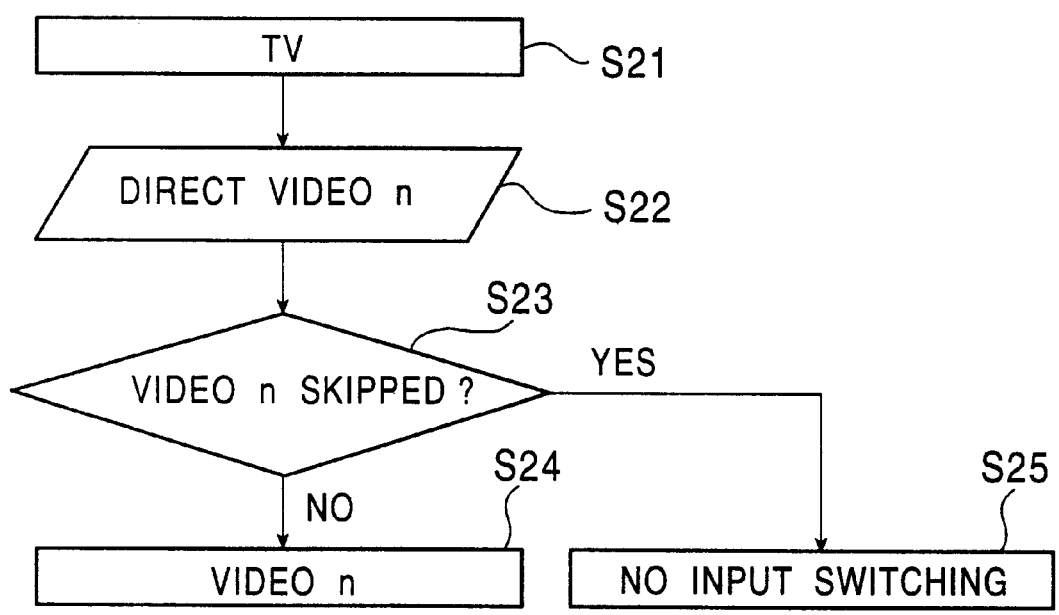
FIG. 5 is a flowchart showing another external-input switching operation in the television receiver shown in FIG. 1.
Figure 8:
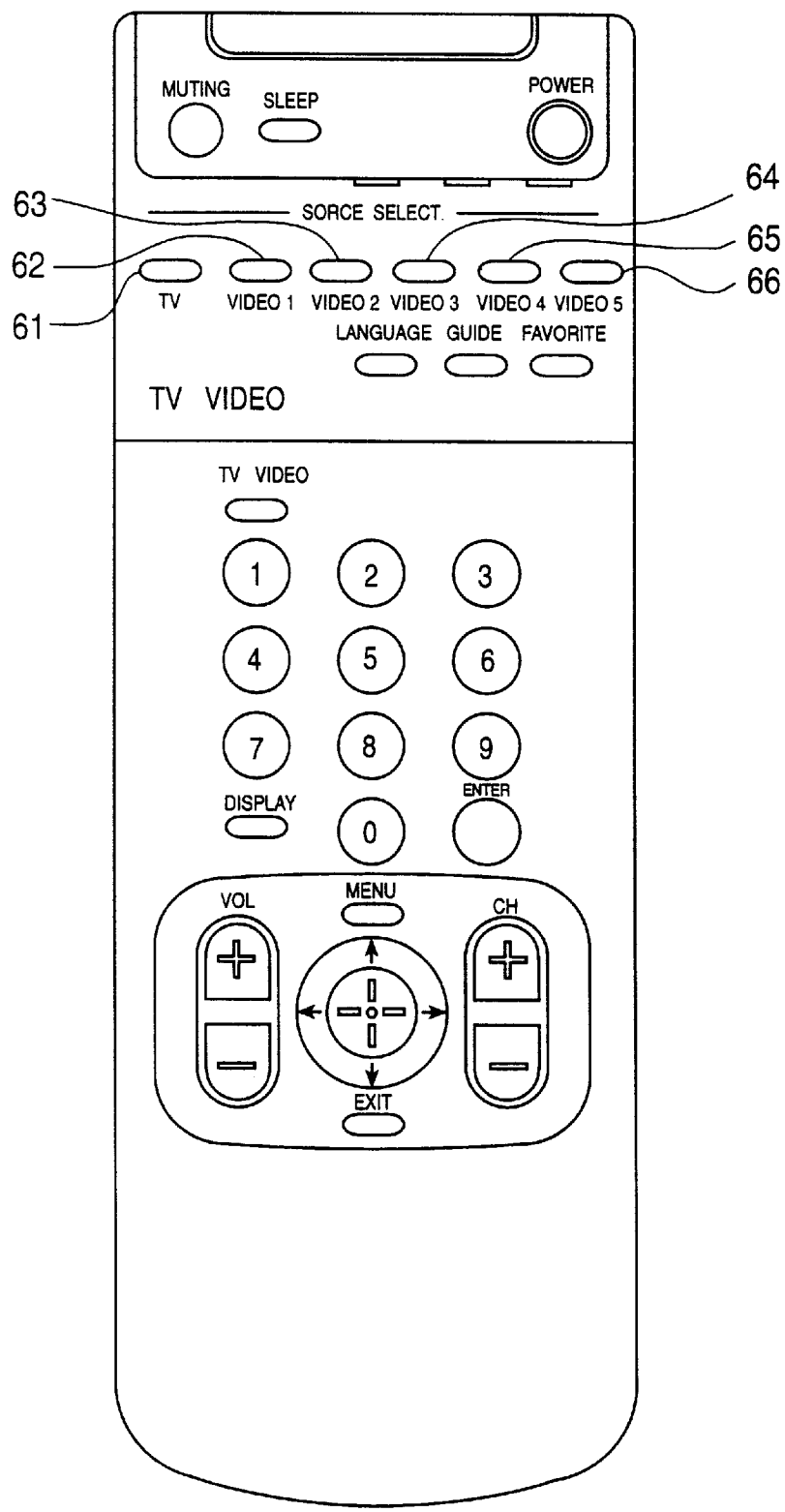
FIG. 8 is a view showing a remote controller for the television receiver shown in FIG. 1.

The process performed when the input switching button is pressed has been described. Next, a process performed when the input-switching direct buttons of a remote controller shown in FIG. 8 are pressed will be described with reference to FIG. 5.

Initially, the input is set at "TV" (step S21). In this condition, one direct video$_n$ button is pressed (step S22). The direct video$_n$ button means a button for directly switching the input to external input terminal Tn where n represents 1, 2, 3, 4 or 5 in this embodiment.

Pressing one direct video$_n$ button determines whether or not external input terminal Tn is set so as to be skipped (step S23). If external input terminal Tn is not set so as to be skipped, switching to external input terminal Tn is performed (step S24), and if external input terminal Tn is set so as to be skipped, switching is not performed (step S25). In this embodiment, the external input terminals excluding T1 are all set so as to be skipped. Accordingly, input switching is performed only when a direct-video 1 button is pressed, and is not performed in other cases.

The foregoing embodiment has described the present invention applied to the television receiver. However, the present invention may be applied to a video monitor, a video display apparatus using a flat panel like a liquid crystal panel, and so forth.

What is claimed is:

1. A video display apparatus provided with a plurality of external input terminals, including:
    storage means for holding connection information on connections between said plurality of external input terminals and external units corresponding thereto;
    display means for displaying the connection information on a screen of said video display apparatus; wherein the connection information displayed on the screen includes information representing the types of said external units connected to said external input terminals;
    a remote controller for setting the connection information displayed on said screen of said video display apparatus and for storing the set connection information in said storage means; said remote controller setting the connection information by selecting one item from the information representing the types of said external units, displayed for selection on the screen; and
    switching control means for controlling the switching between said plurality of external input terminals such that each terminal not connected to the corresponding external unit is skipped based on the connection information stored in said storage means.

2. A video display apparatus according to claim 1, wherein the information representing the types of said external units, displayed for selection on the screen, includes each item to be skipped representing no connection to each external unit.

3. A video display apparatus according to claim 1, wherein said plurality of external input terminals accept at least tuner, composite, and Y-type signals.

4. A switching control method for controlling the switching of a plurality of external input terminals to a video display apparatus, comprising the steps of:
    displaying connection information on a screen of said video display apparatus; wherein the connection information displayed on the screen includes information representing the types of external units connected to said external input terminals;
    setting the connection information displayed on said screen of said video display apparatus using a remote controller and storing the connection information in a memory; said remote controller being used to select one item from the information representing the types of said external units, displayed for selection on the screen; and
    controlling the switching between said plurality of external input terminals by referring to the stored connection information and skipping each external input terminal not connected to an external unit based on the result of the referring.

5. A switching control method according to claim 4, wherein the information representing the types of said external units, displayed for selection on the screen, includes each item to be skipped representing no connection to each external unit.

6. A switching control method according to claim 4, wherein said plurality of external input terminals accept at least tuner, composite, and Y-type signals.

7. A video display apparatus provided with a plurality of external input terminals, including:

storage means for holding connection information on connections between said plurality of external input terminals and external units corresponding thereto;

display means for displaying the connection information on a screen of said video display apparatus; wherein the connection information displayed on the screen includes information representing the types of said external units connected to said external input terminals;

setting means for setting the connection information displayed on said screen of said video display apparatus and for storing the set connection information in said storage means; said setting means setting the connection information by selecting one item from the information representing the types of said external units, displayed for selection on the screen; and switching control means for controlling the switching between said plurality of external input terminals such that each terminal not connected to the corresponding external unit is skipped based on the connection information stored in said storage means.

8. A switching control method for controlling the switching of a plurality of external input terminals to a video display apparatus, comprising the steps of:

displaying connection information on a screen of said video display apparatus, wherein the connection information displayed on the screen includes information representing the types of external units connected to said external input terminals;

setting the connection information displayed on said screen of said video display apparatus and storing the connection information in a memory; the connection information being set by selecting one item from the information representing the types of said external units, displayed for selection on the screen; and controlling the switching between said plurality of external input terminals by referring to the stored connection information and skipping each external input terminal not connected to an external unit based on the result of the referring.

\* \* \* \* \*